United States Patent
Nickens et al.

(10) Patent No.: US 6,308,748 B1
(45) Date of Patent: Oct. 30, 2001

(54) SEALABLE RECOVERY VESSEL SYSTEM AND METHOD FOR ACCESSING VALVED CONTAINERS

(75) Inventors: Dan A. Nickens, Windermere; Charles C. Mattern, Clermonte, both of FL (US); John Carlson, Kingwood, TX (US); Jim Prior, Sanford, FL (US)

(73) Assignee: Earth Resources Corporation, Ocoee, FL (US)

( * ) Notice: Subject to any disclaimer, the term of this patent is extended or adjusted under 35 U.S.C. 154(b) by 0 days.

(21) Appl. No.: 09/670,825

(22) Filed: Sep. 28, 2000

Related U.S. Application Data

(63) Continuation of application No. 08/901,529, filed on Jul. 28, 1997, now Pat. No. 6,164,344.

(51) Int. Cl.⁷ .................................................. B67B 7/46
(52) U.S. Cl. .................................. 141/51; 141/4; 222/87
(58) Field of Search .................................. 141/4, 11, 51, 141/97, 231, 329, 330; 222/87; 251/291, 292

(56) References Cited

U.S. PATENT DOCUMENTS

| | | |
|---|---|---|
| Re. 33,799 | 1/1992 | Gold et al. . |
| 45,183 | 11/1864 | Sexton . |
| 54,783 | 5/1866 | Scotton . |
| 314,085 | 3/1885 | Van Norman . |
| 381,950 | 5/1888 | Pratt . |
| 429,988 | 6/1890 | Zalinski . |
| 556,058 | 3/1896 | Huey . |
| 572,786 | 12/1896 | Downey . |
| 1,167,178 | 1/1916 | Hill . |
| 1,371,103 | 3/1921 | Lucas . |
| 1,478,597 | 12/1923 | Bebler . |
| 1,591,932 | 7/1926 | Young . |
| 1,806,270 | 5/1931 | Thompson . |
| 2,051,981 | 8/1936 | Bowman . |
| 2,101,762 | 12/1937 | Straub . |

(List continued on next page.)

FOREIGN PATENT DOCUMENTS

| | | |
|---|---|---|
| 950614 | 10/1956 | (DE) . |
| 2 120 761 | 12/1983 | (GB) . |
| PCT/US93/04099 | 5/1993 | (WO) . |
| PCT/US94/04797 | 4/1994 | (WO) . |

OTHER PUBLICATIONS

Committee On Alternative Chemical Demilitarization Technologies et al., "Alternative Technologies For The Destruction Of Chemical Agents And Munitions," National Academy Press, 1993, pp. 1–21.

American Petroleum Institute, "Procedures For Welding Or Hot Tapping On Equipment Containing Flammables," API Publication 2201, Third Edition, Oct. 1985.

Earth Resources Corporation, "Comprehensive Management of Compressed Gases."

(List continued on next page.)

Primary Examiner—J. Casimer Jacyna
(74) Attorney, Agent, or Firm—Hunton & Williams

(57) ABSTRACT

A container access system and method for accessing the contents of a container within a sealed containment vessel. A preferred embodiment of the access system includes a sealable vessel for housing a container to be accessed, a remotely operated container valve actuator within the vessel, and a tapping assembly positioned within the containment vessel for accessing the contents of a target container. One or more fluid seals may be made with access mechanisms and the target container. An access mechanism capable of inserting a dip tube into the container to facilitate liquid removal.

7 Claims, 14 Drawing Sheets

U.S. PATENT DOCUMENTS

| | | |
|---|---|---|
| 2,231,448 | 2/1941 | Hooper . |
| 2,338,583 | 1/1944 | Hickman et al. . |
| 2,488,157 | 11/1949 | Bassano . |
| 2,496,606 | 2/1950 | Smith . |
| 2,708,430 | 5/1955 | Smith . |
| 2,756,486 | 7/1956 | Smith . |
| 2,831,475 | 4/1958 | Daniel . |
| 2,911,859 | 11/1959 | Longley et al. . |
| 2,960,977 | 11/1960 | Moorhead, Jr. . |
| 2,985,050 | 5/1961 | Schwacha . |
| 3,045,511 | 7/1962 | Risley . |
| 3,091,052 | 5/1963 | Ryan . |
| 3,333,735 | 8/1967 | Odasso . |
| 3,358,883 | 12/1967 | Loe . |
| 3,364,939 | 1/1968 | Valenziano . |
| 3,394,905 | 7/1968 | Rapp . |
| 3,422,808 | 1/1969 | Stein et al. . |
| 3,428,037 | 2/1969 | Capriolo et al. . |
| 3,430,619 | 3/1969 | Silver et al. . |
| 3,481,529 | 12/1969 | Mugele . |
| 3,486,840 | 12/1969 | Burton et al. . |
| 3,495,615 | 2/1970 | Ehrens et al. . |
| 3,662,791 | 5/1972 | Ruscitti . |
| 3,719,028 | 3/1973 | Brooks . |
| 3,746,256 | 7/1973 | Hall et al. . |
| 3,821,965 | 7/1974 | Reynolds . |
| 3,870,474 | 3/1975 | Houston . |
| 3,926,135 | 12/1975 | De Gregorio . |
| 3,926,340 | 12/1975 | Tygenhof . |
| 3,929,411 | 12/1975 | Takano et al. . |
| 3,939,816 | 2/1976 | Espy . |
| 3,974,846 | 8/1976 | Serota . |
| 3,983,756 | 10/1976 | Danguillier et al. . |
| 3,993,221 | 11/1976 | Boynton et al. . |
| 3,995,655 | 12/1976 | Sands . |
| 4,038,032 | 7/1977 | Brewer et al. . |
| 4,046,055 | 9/1977 | McDanolds et al. . |
| 4,049,367 | 9/1977 | Tominaga et al. . |
| 4,110,929 | 9/1978 | Weigand . |
| 4,112,797 | 9/1978 | Pearl . |
| 4,132,504 | 1/1979 | Fitch . |
| 4,160,806 | 7/1979 | Long et al. . |
| 4,166,481 | 9/1979 | Farris . |
| 4,168,243 | 9/1979 | Gablin et al. . |
| 4,169,403 | 10/1979 | Hanson . |
| 4,208,383 | 6/1980 | Kisters et al. . |
| 4,213,479 | 7/1980 | Pearson . |
| 4,235,739 | 11/1980 | Baatz et al. . |
| 4,255,168 | 3/1981 | Nguyen . |
| 4,274,463 | 6/1981 | Lee . |
| 4,312,254 | 1/1982 | Pearl . |
| 4,344,467 | 8/1982 | Lahde . |
| 4,349,054 | 9/1982 | Chipman et al. . |
| 4,350,052 | 9/1982 | Kendall . |
| 4,386,637 | 6/1983 | Buchanan et al. . |
| 4,399,829 | 8/1983 | Schuler . |
| 4,407,341 * | 10/1983 | Feldt et al. ............................ 141/97 |
| 4,411,846 | 10/1983 | Ulrich et al. . |
| 4,421,037 | 12/1983 | Leam . |
| 4,452,377 | 6/1984 | Hurley et al. . |
| 4,475,566 | 10/1984 | Haines . |
| 4,500,015 | 2/1985 | Penny . |
| 4,580,700 | 4/1986 | Rush . |
| 4,620,466 | 11/1986 | Jumel et al. . |
| 4,629,157 * | 12/1986 | Tsuchiya et al. .................... 251/291 |
| 4,665,827 | 5/1987 | Ellis, II . |
| 4,679,987 | 7/1987 | Olsen . |
| 4,690,180 | 9/1987 | Gold . |
| 4,718,834 | 1/1988 | Ebner et al. . |
| 4,734,108 | 3/1988 | Cox et al. . |
| 4,762,467 | 8/1988 | Ackermann et al. . |
| 4,792,284 | 12/1988 | Straub et al. . |
| 4,795,315 | 1/1989 | Schultze . |
| 4,802,515 * | 2/1989 | Pytryga et al. ........................ 141/97 |
| 4,874,587 | 10/1989 | Galloway . |
| 4,875,420 | 10/1989 | Hay et al. . |
| 4,881,517 | 11/1989 | Wackrow et al. . |
| 4,944,333 | 7/1990 | Gold et al. . |
| 4,966,317 | 10/1990 | Barr . |
| 5,017,047 | 5/1991 | Myles et al. . |
| 5,025,730 | 6/1991 | Petrovich . |
| 5,030,039 | 7/1991 | Dove . |
| 5,035,269 * | 7/1991 | Pytryga et al. ........................ 141/97 |
| 5,055,003 | 10/1991 | Svensson . |
| 5,067,529 | 11/1991 | Gonzales-Miller et al. . |
| 5,076,311 | 12/1991 | Marschke . |
| 5,114,043 | 5/1992 | Collins, Jr. . |
| 5,134,921 | 8/1992 | Breed et al. . |
| 5,150,909 | 9/1992 | Fitzwater . |
| 5,163,462 | 11/1992 | Leemput et al. . |
| 5,163,483 | 11/1992 | Eckman . |
| 5,163,585 | 11/1992 | Campbell . |
| 5,174,344 | 12/1992 | Gonzales-Miller et al. . |
| 5,186,219 | 2/1993 | Gold et al. . |
| 5,197,863 | 3/1993 | Dardis et al. . |
| 5,210,368 | 5/1993 | Heller, Jr. et al. . |
| 5,230,324 | 7/1993 | Van Horssen et al. . |
| 5,265,762 | 11/1993 | Campbell et al. . |
| 5,269,352 | 12/1993 | Gold et al. . |
| 5,271,437 | 12/1993 | O'Brian et al. . |
| 5,273,088 | 12/1993 | Cripe et al. . |
| 5,275,214 | 1/1994 | Rehberger . |
| 5,279,646 | 1/1994 | Schwab . |
| 5,285,827 | 2/1994 | Gonzales-Miller et al. . |
| 5,303,749 * | 4/1994 | Stock et al. .............................. 141/4 |
| 5,325,787 | 7/1994 | Boual . |
| 5,337,793 | 8/1994 | Gold et al. . |
| 5,339,876 | 8/1994 | Mattern . |
| 5,340,244 | 8/1994 | Hawley et al. . |
| 5,365,913 | 11/1994 | Walton . |
| 5,383,498 | 1/1995 | Mattern et al. . |
| 5,383,499 | 1/1995 | Mattern . |
| 5,427,157 | 6/1995 | Nickens et al. . |
| 5,460,154 | 10/1995 | Mattern et al. . |
| 5,469,898 | 11/1995 | Campbell . |
| 5,474,114 * | 12/1995 | Nickens et al. ........................ 141/51 |
| 5,499,665 | 3/1996 | Gold et al. . |
| 5,507,604 | 4/1996 | Hawley et al. . |
| 5,573,043 | 11/1996 | Fuehrer . |
| 5,584,325 | 12/1996 | Nickens et al. . |
| 5,613,553 | 3/1997 | Gold et al. . |
| 5,618,137 | 4/1997 | Hawley et al. . |
| 5,636,666 | 6/1997 | Mattern . |
| 5,647,408 | 7/1997 | Erste et al. . |
| 5,664,610 | 9/1997 | Nickens et al. . |
| 5,715,803 | 2/1998 | Mattern . |

OTHER PUBLICATIONS

Earth Resources Corporation, "Statement of Qualifications–Compressed Gas Management Services," 1993.

Earth Resources Corporation, "Providing The Total Solution To Compressed Gas Problems With A Commitment To Safety & Quality," 1993.

E. I. DuPont de Nemours & Co., "Krytox Fluorinated Greases," Nov. 1988.

E.I. DuPont de Nemours & Co., "Krytox Severe Service Lubricants for Industrial, Automotive, Aerospace and Electronic Applications," Technical Marketing Company, Inc.

E.I. DuPont de Nemours & Co., "Krytox Vacuum Pump Fluids."

E.I. DuPont de Nemours & Co., "Krytox LVP High–Vacuum Grease Performs Dependably –No Matter What Conditions Your System Operates Under."

E.I. DuPont de Nemours & Co., "Vacuum Pump Fluids." Generic Specifications For the Treatment of CWM, Section 7.3, U.S. Army Manual, pp. 7–15 through 7–19.

State of Florida, Agency for Health Care Administration, "Minutes Of The Joint Committee Meeting With The Community Health Purchasing Alliance (CBPA) Data Advisory Committee And The Comprehensive Health Related Information System (CHFIS) Advisory Council," Aug. 1993.

"Destruction Agency Generic Site Scoping Study," U.S. Army Chemical Material, Dec. 3, 1993.

"Shock Test Squeezes Core Temperature," *Science*, vol. 267, Mar. 17, 1995.

Browne, M., "Big Gun Makes Hydrogen Into A Metal," *The New York Times*, Mar. 26, 1996.

* cited by examiner

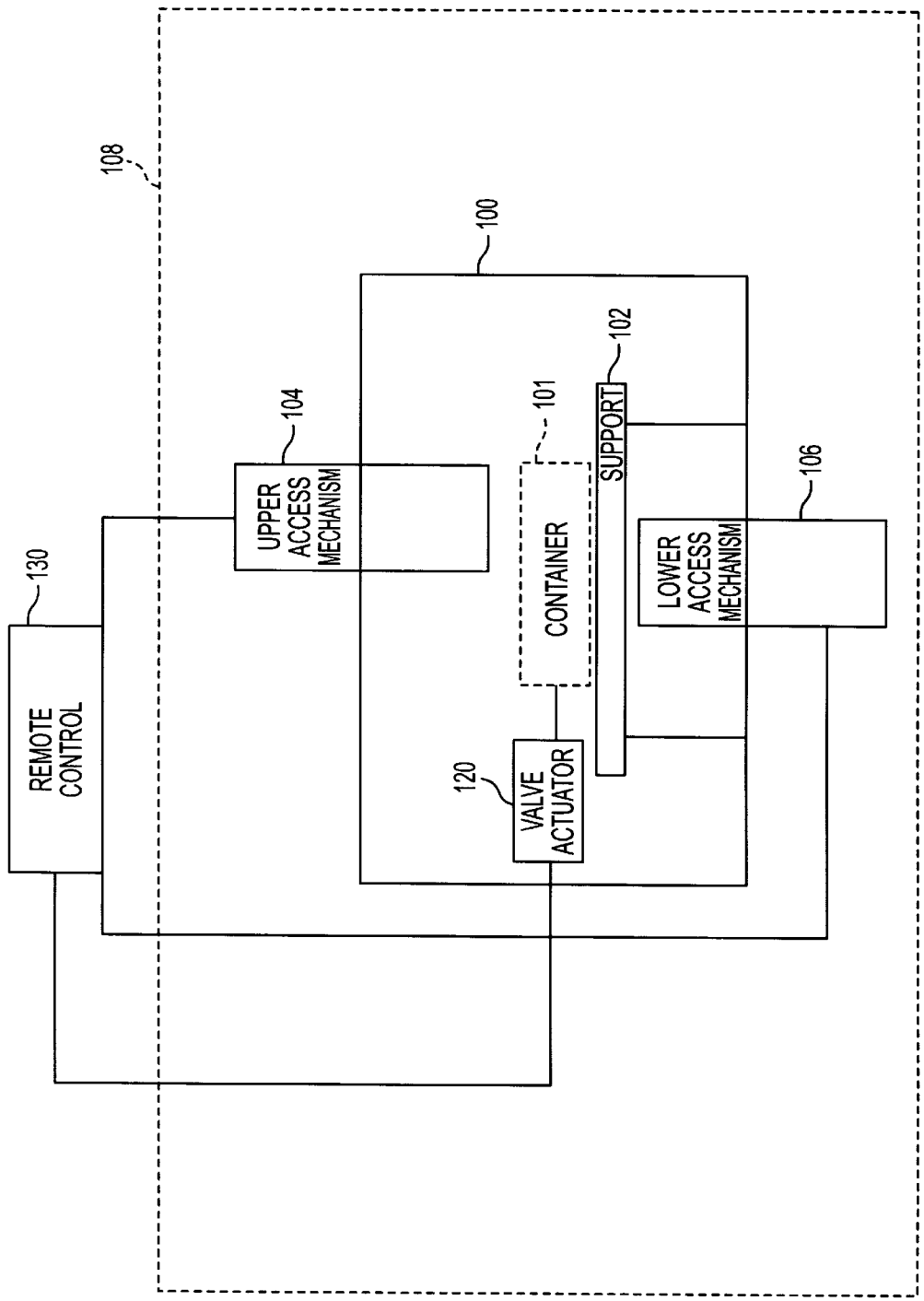

SEALABLE RECOVERY VESSEL SYSTEM AND METHOD FOR ACCESSING VALVED CONTAINERS

This is a continuation of application Ser. No. 08/901,529, filed Jul. 28, 1997, now U.S. Pat. No. 6,164,344.

FIELD OF THE INVENTION

The invention relates to remote valve actuation of a container within a sealable recovery vessel that is provided with an additional access mechanism for accessing contents of the container if attempted remote valve actuation does not permit access to the contents of the container.

BACKGROUND OF THE INVENTION

Various types of valved containers are well known. Such containers are commonly used to contain toxic, unstable, reactive, unknown or other potentially hazardous materials. For simplicity, these materials will be generally referred to as hazardous materials.

Valved containers are generally accessed by actuation of the valve or valves integrally associated with the container. Valve actuation generally involves rotation of a valve from a closed position to an open position. Valve actuation provides access to the contents of the valved container, for example, by venting the material from the container. Manual actuation of valves containers can be dangerous or otherwise undesired under certain circumstances. This is especially so with containers housing hazardous materials.

Remote valve actuation techniques are generally known and have been used in some applications. Remote valve actuators have been used in some situations to open valves which are normally manually opened. Remote valve actuation is typically preferred where safety and environmental concerns associated with the valved container contents exist, especially where such contents may be toxic, unstable, reactive or otherwise potentially dangerous. Remotely actuated valves have been used in conjunction with "gas cabinets" which are boxes vented to an appropriate treatment system.

In some instances, attempted manual valve actuation may result in leakage, uncontrolled reactions, or other problems. In such circumstances, the use of remote valve actuation may provide some isolation of personnel, but typically does not offer containment of the contents. Content containment is particularly desirable where the container contents are unknown or hazardous.

In some cases, neither remote nor manual valve actuation is suitable. For example, valve actuation may not be effective for accessing container contents where the valve is defective or where the valve body is blocked (eg., by corrosion products or polymerized materials). For such situations it may be necessary to access the contents through alternative mechanisms. One such alternative is using what is referred to as a Cylinder Rupture Vessel ("CRV"). For example, CRVs such as those described in U.S. Pat. No. Re. 33,799 entitled "Cylinder Rupture Vessel"; 4,944,333 entitled "Cylinder Rupture Vessel with Clamps for Immobilizing a Container Within the Vessel;" U.S. Pat. No. 5,186,219 entitled "Cylinder Rupture Vessel;" U.S. Pat. No. 5,339,876 entitled "Apparatus and Methods for Removing Hazardous Contents from Compressed Gas Cylinders;" U.S. Pat. No. 5,383,498 entitled "Cylinder Rupture Vessel with Cylinder Rotation Mechanism and Rupture Mechanism;" U.S. Pat. No. 5,383,499 entitled "System for Removal of Unknown, Corrosive, or Potentially Hazardous Gases From a Gas Container;" U.S. Pat. No. 5,427,157 entitled "Apparatus and Method for Controlled Penetration of Compressed Fluid Cylinders;" U.S. Pat. No. 5,474,114 entitled "Apparatus and Method for Controlled Penetration of Compressed Fluid Cylinders;" U.S. Pat. No. 5,499,665 entitled "Cylinder Rupture Vessel;" U.S. Pat. No. 5,584,325 entitled "Apparatus and Method for Controlled Penetration of Compressed Fluid Cylinders;" and U.S. Pat. No. 5,613,533 entitled "Cylinder Rupture Vessel;" enable access to the contents of containers (including, but not limited to cylinders with inoperable valves) in a controlled environment. Such containers may be cylinders, munitions, drums or other containers, containing either known or unknown substances. For simplicity, the term "container" will be used herein broadly to refer to cylinders, munitions, drums or other containers containing known or unknown substances (whether pressurized or not).

The general structure and operation of a sealable recovery vessel, such as a CRV, is described, for example, in the aforementioned patents which are incorporated herein by reference in their entirety. Briefly, a CRV generally comprises a sealed chamber with an access door for enabling a container to be located therein on a support surface. A sealing mechanism is provided to seal the chamber. Inlet and outlet ports may be provided for creating a vacuum and/or introducing inert gas into the CRV and for purging air and inert gas from the container to control the environment during processing of the container. In a CRV, an access mechanism is typically provided for gaining access to the inside of the container. Access can be obtained, for example, by rupturing a wall of the container using a rupture mechanism such as a punch, spike, drill, projectile or saw or by shearing the container near the valve to remove the valve. The term "rupture" is understood broadly to mean gaining access to the interior of the container by penetrating a wall or a portion of the container by these or other mechanisms. In some prior CRVs, the container is held stationary by chains or other securing mechanisms. It is also known to invert the container after rupturing to facilitate the removal of its contents, especially when those contents are liquids. Other functions and feature of CRVs are disclosed in the aforementioned patents.

Accessing the contents of a container by use of a CRV enables controlled access to the contents of the container. For example, the CRV may prevent leakage of the contents into the environment and may be designed to withstand explosions caused by accessing the contents should they occur in the CRV. The use of a CRV provides these and other safety advantages, especially where normal valve operation is not possible. However, the use of a CRV can be more costly than normal valve operation. Remote valve actuation outside of a CRV can be cheaper, but presents certain risks. Thus, existing systems leave the alternatives of deciding whether to use a cheaper, potentially unsafe approach to access a valved container or to use a safer but potentially more costly approach.

Other techniques have been developed in an attempt to deal with accessing valved cylinders. For example, a device for removing a cylinder valve inside of an "overpack" by unscrewing the valve from the cylinder body is known. This device does not permit actuation of the valve. Rather, it removes the valve. This technique has various drawbacks and safety issues. For example, some potential drawbacks are that the valve body may be corroded to the cylinder and thus not removable, the valve may break without releasing the contents, and removal of the valve may leave corrosion product remaining in the cylinder, which may block the valve orifice. Other drawbacks also exist.

It is known that liquid filled containers may be fitted with dip tubes attached to the valve mechanism to remove liquid contents. One drawback of this technique is that these tubes do not permit all of the product to be removed and, typically, a significant quantity is left in the container which cannot be removed in a liquid phase through the valve. The residual content may be particularly significant in the case of large containers such as ton containers. This is a drawback with existing dip tubes.

These and other drawbacks exist in heretofore known systems.

SUMMARY OF THE INVENTION

An object of the invention is to overcome these and other drawbacks of known systems and techniques.

Another object of the invention is to provide remote valve actuation inside a sealable recovery vessel.

Another object of the invention is to provide a sealable recovery vessel system that enables the operator to selectively perform remote valve actuation within the sealable recovery vessel or to use an alternative technique to gain access to the contents of a valved container within the sealable recovery vessel.

Another object of the invention is to provide an access mechanism within a sealable recovery vessel system that more fully enables removal of liquid contents from containers that are accessed through a valve of the container or through a container wall using an integral dip tube.

Another object of the invention is to provide a mechanism to access a container through an uppermost surface thereof and to extract the contents of the container through a tube which is lowered from an upper portion of the container to a lower portion of the container.

According to one preferred embodiment, a sealable recovery vessel is provided with a remotely operable actuator that is attachable to the valve of a valved container is located within the sealable recovery vessel. Successful actuation of the valve within the sealable recovery vessel permits withdrawal of the contents from the container in a normal mode. Protection against leakage or other valve failure is provided by the sealable recovery vessel. Yet, the procedures necessary to accomplish access to the container contents by the access mechanism of the sealable recovery vessel are not required if the remote valve actuation is successful. However, the alternative access mechanism(s) may be used in a back-up mode if remote valve actuation is not successful and/or for the removal of residual liquids (or other contents) that cannot be removed through the container valve. The access mechanism may also be used to introduce cleaning liquids, reagents, steam or other material to facilitate the removal of residual liquids, solids and other container contents, and to clean/decontaminate the container after removal of the bulk of the contents thereof.

In accordance with one embodiment of the present invention, the remote valve actuator may comprise at least a portion within the sealable recovery vessel that is engageable with a valve of a container located therein and a portion external to the sealable recovery vessel to connect to a remote power source. The remote valve actuator may be hydraulically, electrically or pneumatically powered. The pressure may be adjusted to prevent excessive torque application. Torque limiters may also be employed to prevent excessive torque application.

According to one embodiment of the present invention, a sealable recovery vessel is used to provide containment for accessing the contents of a container located therein. The contents of the container (e.g., hazardous material), may then be sampled for identification and safely removed in a manner which is protective of the environment. The pressure in the container can range up to 2000 psi or higher. Additionally, the material within the container may be in a gas phase, a liquid phase, or a combination of both a gas and liquid phase. Solids, powders, biological agents and other materials may also be present.

Typically, the container has been sealed either purposefully or inadvertently, and must be opened to access the contents. In some cases it is prudent to open it remotely due to the hazardous nature of the contents which may be air reactive, shock sensitive, extremely toxic, or otherwise hazardous. Federal safety regulations require that containers located at hazardous waste sites be opened behind a protective barrier to protect employees in the event of an accidental explosion (29 C.F.R. 1910.120 (j) (2) ).

Unlabeled containers must be assumed to contain hazardous substances and handled accordingly (29 C.F.R. 1910.120 (j) (1) (iv)). The present invention addresses these and other safety and environmental precautions and provides additional benefits.

In one embodiment of the present invention, the access mechanism(s) may comprise one or more of an upper and a lower access assembly. For example, these assemblies may be drilling assemblies or other structures for penetrating one or more wall portions of a container located inside of a sealable recovery vessel. The container may be supported on a support located within the sealable recovery vessel. A roller mechanism may be incorporated into the support to permit the container to be rotated along an axis thereof (e.g., a longitudinal axis). The upper and lower access assemblies may also allow removal of contents from the container and introduction of cleaning reagents and other materials into the container.

According to one embodiment of the present invention, at least the upper access assembly comprises a hollow shaft that is mounted on an upper surface of the sealable recovery vessel. The shaft is sealed in a manner that permits a portion of the shaft to be moved vertically into the sealable recovery vessel and the container while maintaining a gas and liquid tight environment within the sealable recovery vessel. A seal cup is mounted to an end of the shaft that is inside of the sealable recovery vessel. The seal cup may be pressed against the container to form a seal therewith. This seal can help prevent contents of the container from being introduced into the sealable recovery vessel. This avoids unnecessary cleaning and decontaminating of the sealable recovery vessel which can be time consuming and costly. The top portion of the shaft extending outside of the sealable recovery vessel may be connected with a rotatable union through which the container contents may be withdrawn or through which cleaning reagents or other material may be introduced into the container. The lower access mechanism may comprise an access mechanism such as shown in U.S. Pat. No. 5,383,498, or U.S. Pat. No. 5,427,157, or U.S. Pat. No. 5,474,114, which provides a mechanism for sealing against the container surface. Access mechanisms that do not form a seal with the container and that do allow the container contents to enter the sealable recovery vessel may also be used if desired.

A first technical advantage of the present invention is that it permits remote access to contents of valved containers within a sealable recovery vessel, which offers additional safety and environmental protection against failure during valve actuation.

A second technical advantage of the present invention is that a container may be accessed through access mechanisms inside of a sealed containment unit without removal of the container should the remote valve operation fail or if the valve is blocked, and for other reasons.

A third technical advantage of the present invention is that liquid and other container contents may be more fully and easily accessed from a top portion of the container and thereby minimize or lessen the potential for liquid leakage into the recovery vessel (as might otherwise occur if drainage through a bottom surface is used) and the concomitant need to clean/decontaminate the recovery vessel after processing a container.

A fourth technical advantage of the present invention is that liquids may be efficiently removed through a dip tube incorporated into an upper access mechanism of the sealable recovery vessel.

A fifth technical advantage of the present invention is that residual liquids remaining in large containers below the level of the dip tube may be removed through a lower access mechanism.

Other objects and advantages of the present invention will be apparent from the detailed description of the preferred embodiments and the drawings.

BRIEF DESCRIPTION OF THE DRAWINGS

FIG. 1A is a block diagram of a sealable recovery vessel with a remote valve actuator and alternative container access mechanisms.

DETAILED DESCRIPTION OF THE PREFERRED EMBODIMENTS

Figure 1B:
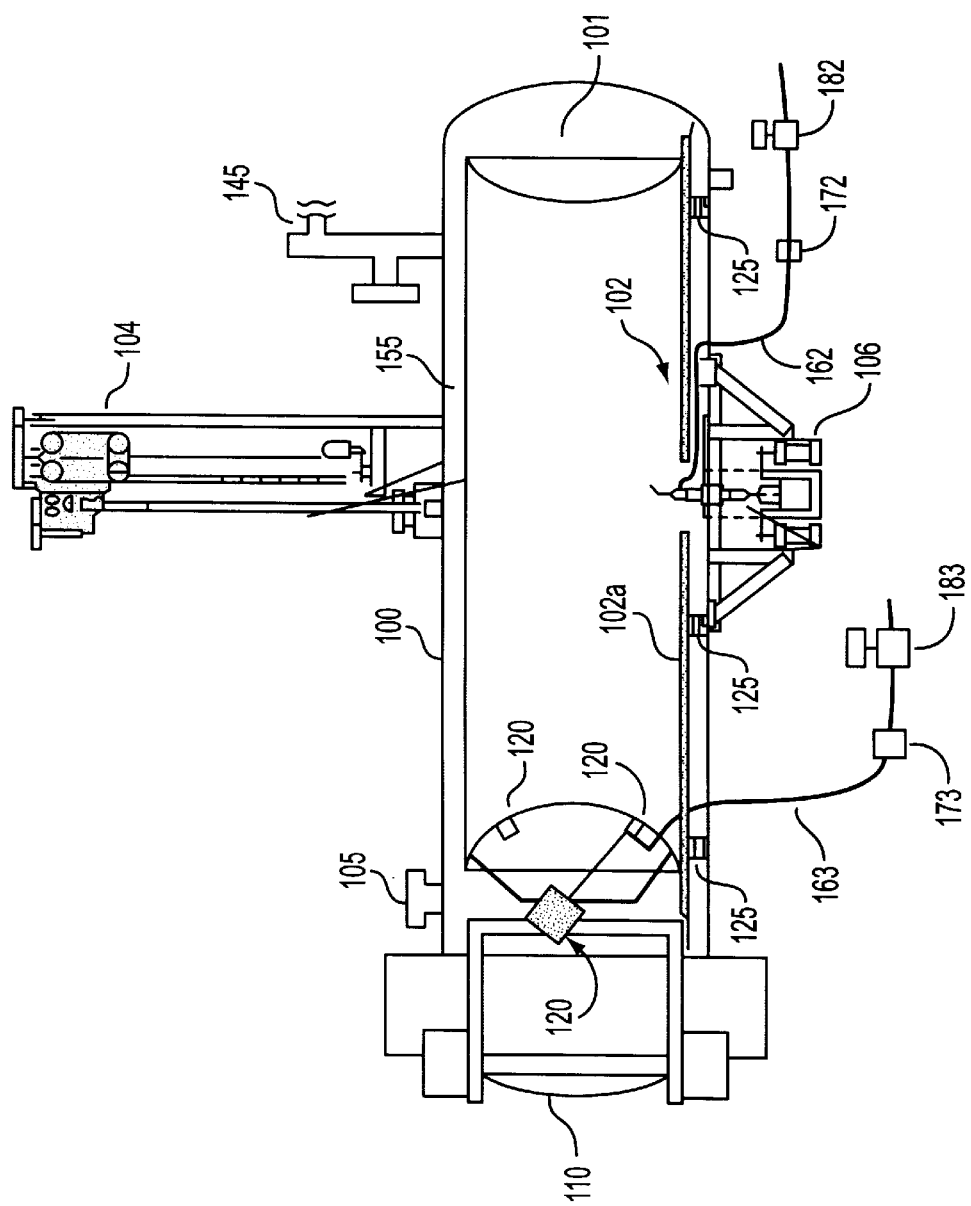
FIG. 1B is a schematic illustration of a sealable recovery vessel according to one embodiment of the present invention.

FIG. 1A illustrates a block diagram of a container processing system, according to one embodiment of the present invention. FIG. 1A depicts a sealable recovery vessel 100, having a support 102 on which a valved container 101 (shown in phantom) may be located. A remote valve actuator 120 powered by a remote power source 130 is provided to enable remote actuation of the valve within the sealable recovery vessel 100. Additionally, one or more alternative access mechanisms (e.g., an upper and a lower access mechanism) 104, 106 may be provided to gain access to the contents of container 101 within sealable recovery vessel 100. For example, upper access mechanism 104 and/or lower access mechanism 106 may be provided to access the contents of container 101 from above and/or below. This system may be housed in a sealable trailer 108 or other mobile device to provide an additional level of containment for the system and to enable movement of the system to the location of a container. Mobility of the system increases the safety of the process by minimizing the need to move deteriorated containers and avoids regulatory prohibitions against transportation of unknown materials.

FIG. 1B illustrates one embodiment of sealable recovery vessel 100, including a sealable end opening 110, a remote valve actuator 120, an upper access mechanism 104, and a lower access mechanism 106. Container 101 may be inserted into the vessel 100 through sealable end opening 110 and be located on a support 102, such as a platform assembly disposed within sealable recovery vessel 100. Platform assembly 102 may comprise a platform 102a which is supported by a plurality (e.g., four or more) support springs 125. Support springs 125 allow platform 102a to move in a direction perpendicular to the plane of platform 102a. In other embodiments, the support 102 may be rotatable thereby enabling the system to cause the container to rotate. Rotation of the support may be advantageous to remotely invert the container and facilitate liquid removal or decontamination.

If desired, pressure relief devices 145 may be provided in communication with sealable recovery vessel 100. Pressure relief device 145 may be spring operated and may be vented to other containment or treatment units (not shown). Pressure relief device 145 in a preferred embodiment comprises a frangible disk that vents to the containment chamber of the mobile trailer 108 and a spring loaded safety that vents at a pressure less than the burst pressure of the frangible disk.

Figure 2:
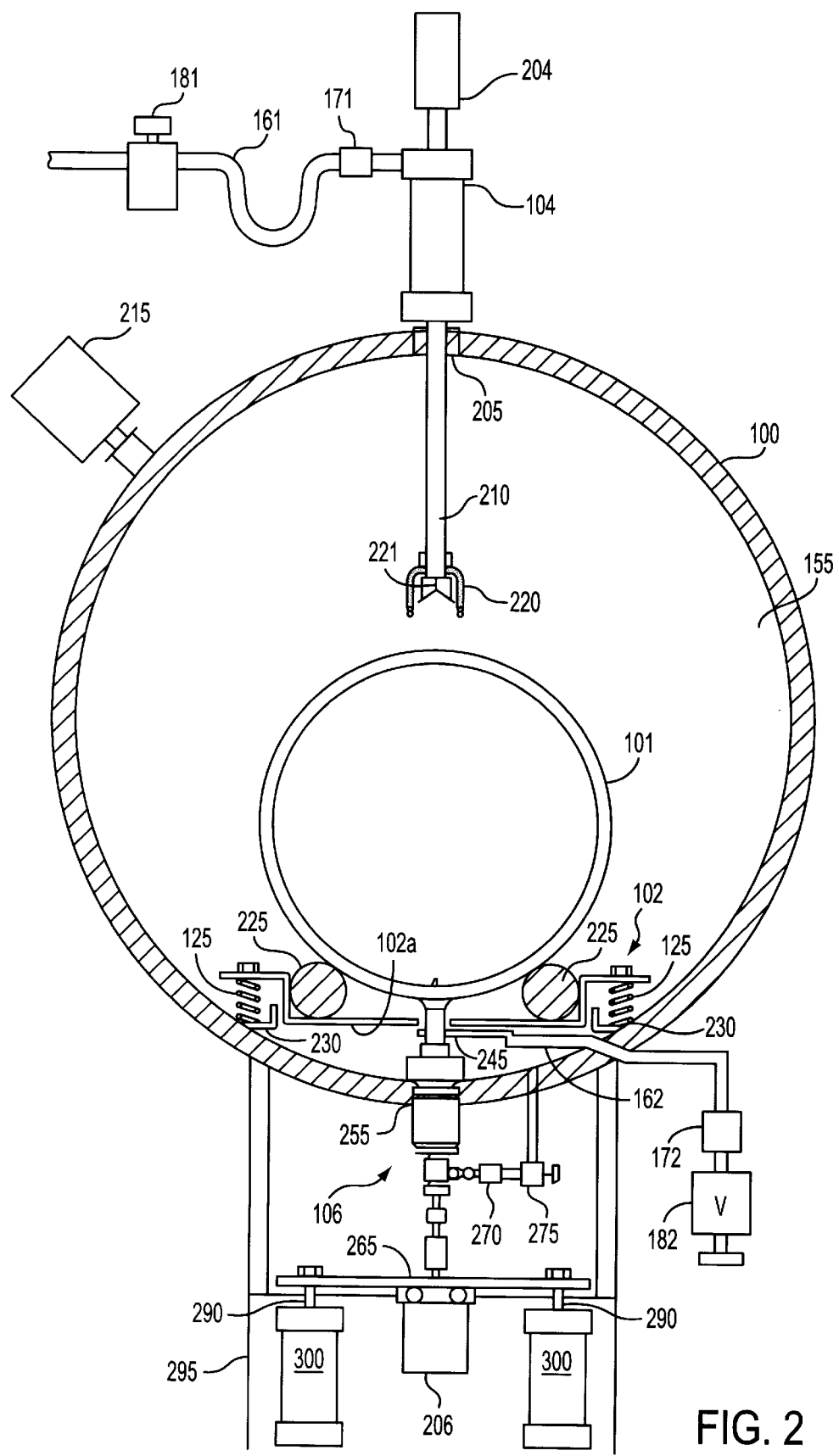
FIG. 2 is a cross-sectional view according to one embodiment of the present invention.

Referring to FIGS. 1B and 2, access lines 161, 162, and 163 are attached to the upper access mechanism 104, the lower access mechanism 106, and to the remotely operated valve actuator 120, respectively. Pressure transducers 171, 172 and 173 and control valves 181, 182 and 183 are connected with access lines 161, 162 and 163, respectively.

At least upper access mechanism 104, the lower access mechanism 106, the remote valve actuator 120, the rotatable support 102 (not shown), valves 181, 182 and 183 and other process features are all capable of being controlled remotely from a, remote control panel 130. As shown in FIG. 1A, remote control panel may be located outside of mobile trailer 108 at a distance sufficient to provide for safe operation. Alternatively, it may be located within the mobile trailer 108 or a portion thereof. A light source 105 may be provided to illuminate the interior of sealable recovery vessel 100.

FIG. 2 shows a cross-sectional view of a container processing system according to one embodiment. In this embodiment, the upper access mechanism 104 is shown as comprising a drill assembly powered by a motor 204. The upper access mechanism 104 (e.g., the drill assembly) is connected with pressure transducer 171, access line 161 and control valve 181. A portion of the upper assembly extends through opening 205 in the wall of sealable recovery vessel 100. Lower access mechanism 106 preferably comprises a lower drill assembly powered by a motor 206. The lower access mechanism may be supported by a support platform 265. Support platform 265 may be connected with hydraulic cylinders 300 via pistons 290 to enable the lower access mechanism to be raised and lowered. The lower assembly is connected with pressure transducer 172, access line 162 and control valve 182. A portion of the lower assembly passes through an opening 255 in a lower portion of the sealable recovery vessel 100. Openings 205 and 255 are sealed, preferably with either a packing or mechanical seal. In one embodiment, there is an off-set between the positions of the upper and lower access assemblies. This feature can help facilitate decontamination of the interior of the container.

As detailed below, at least upper access assembly 104 further comprises a seal cup 220, a drill bit (or other mechanical device) having an orifice 221, and hollow shaft 210.

As shown in earlier patents (for example, U.S. Pat. Nos. 4,690,180; U.S. Pat. No. Re. 33,799; U.S. Pat. Nos. 4,944,333; 5,186,219; 5,337,793; 5,383,498), the support 102 may comprise two rails 225. Rails 225 cooperate with a downward force provided by upper drill assembly 104 to secure the container 101 during access. A variety of rail arrangements are possible. Preferably, the rails 225 are rotatable to permit rotation of the container within the recovery vessel. Springs 125 and spring supports 230 are also provided. Access assemblies 104 and 106, motors 204 and 206, and support 265 are shown disposed in one possible orientation with respect to sealable recovery vessel 100. Other orientations may be used. An enclosure 295 may be provided for the lower access assembly 106.

Video camera 215 is provided to allow the operator to view the inside of sealable recovery vessel 100 from a remote location. Light source 105 (FIG. 1B) illuminates interior 155 of sealable recovery vessel 100.

Figure 3:
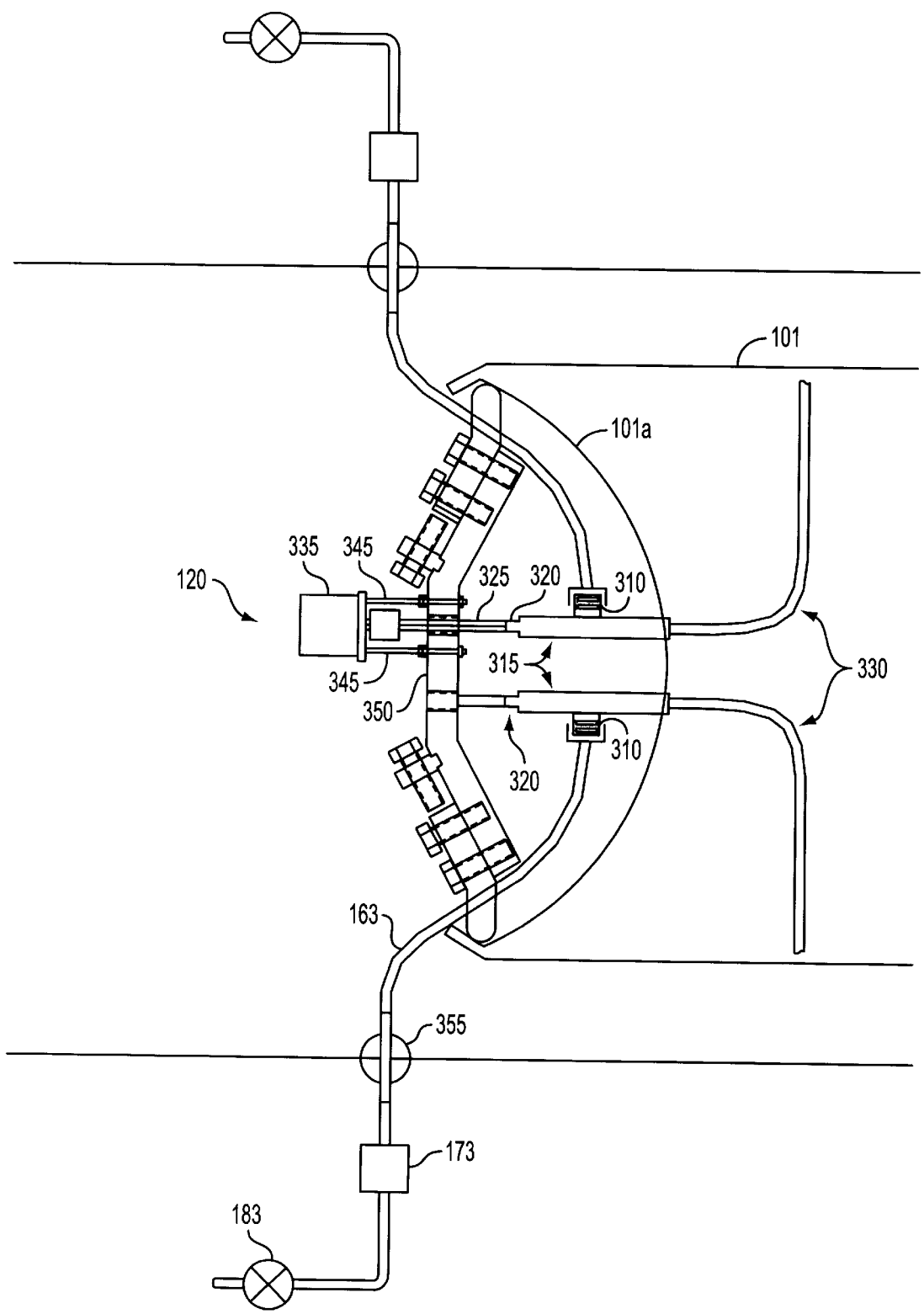
FIG. 3 is a schematic side view of the remote valve actuator of FIG. 1B according to one embodiment of the present invention.

FIG. 3 shows one example of a remote valve actuator 120. This mechanism as shown is adapted for use on ton containers (for example, U.S. DOT Specification 106A800X, 106A500X). These large containers 101 are typically outfitted with two valves 315, each connected to a goose-neck access tube 330. Threaded valve connectors 310 may be provided on valve 315. Remotely operated valve actuator 120 preferably comprises an adjustable base plate 350 which is located against the inner rim 101a of container 101. A remote controlled drive 335 is attached to the adjustable base plate 350 by drive supports 345. Shaft 325 is adapted to fit one of the ¼" square valve stems 320. The attachment may be held in place by springs or other suitable support mechanisms. Remote valve actuator may alternatively be configured to provide two independent units for actuation of either or both container valves 315. Access tube 163 is provided for the introduction to and removal from the container 101 of material and may be connected to one or more of threaded valve connections 310. Access tube 163 extends through sealable recovery vessel 100 at sealed opening 355. The introduction to and removal from the container 101 of material may be controlled by control valve 183. Alternate remote actuation mechanisms may be adapted for a variety of container/valve configurations.

Figure 4:
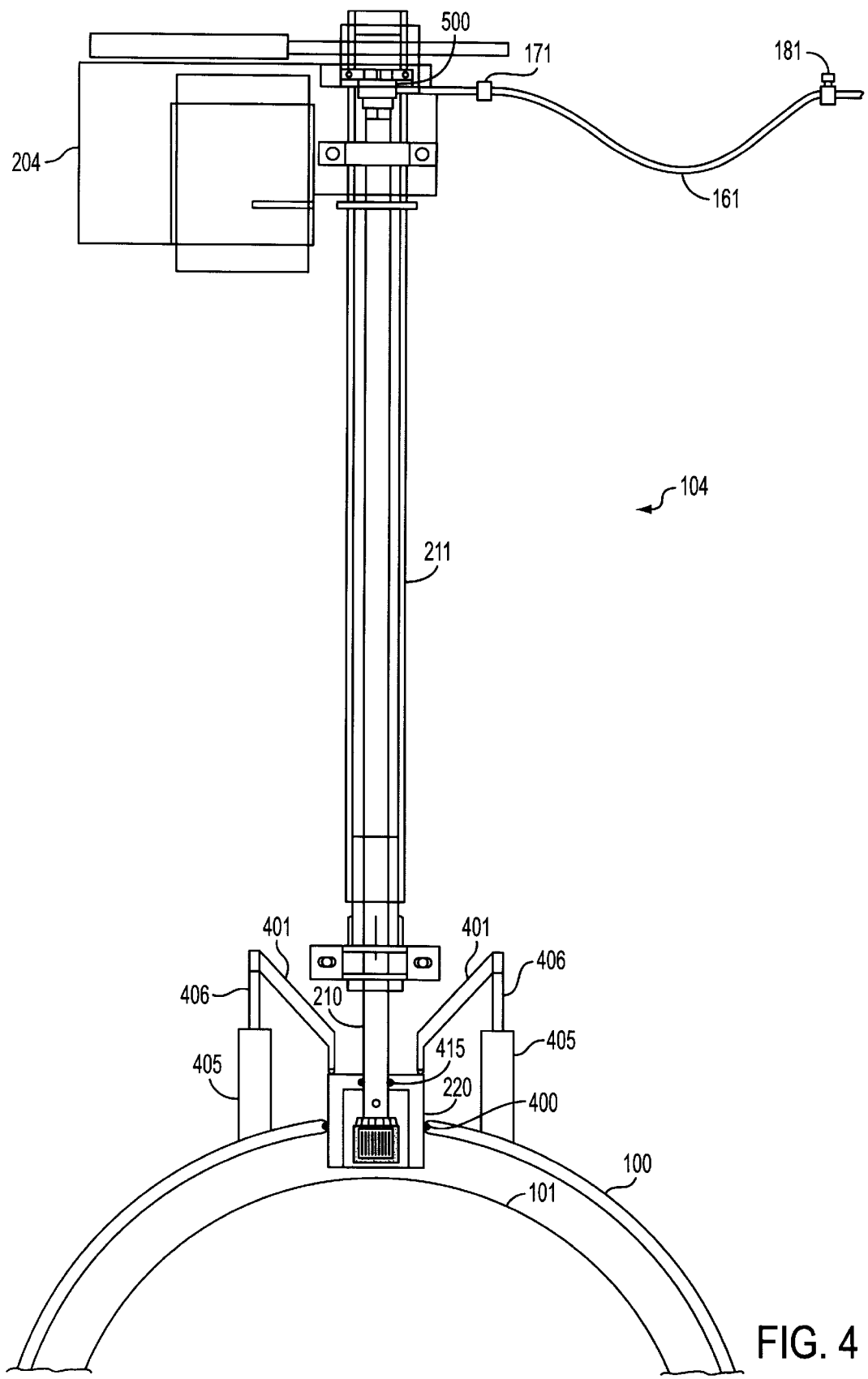
FIG. 4 is a schematic illustration of an access assembly for penetrating a container within a sealable recovery vessel according to one embodiment of the present invention.

FIG. 4 depicts a detailed view of one embodiment of an upper access mechanism 104 according to one embodiment of the invention. Other access mechanisms may be used. As detailed below, the upper access mechanism 104, which is mounted on the top of sealable recovery vessel 100, can adaptively adjust to accommodate several sizes of containers 101. According to one embodiment, the upper assembly comprises a motor 204 connected to drive shaft 210. A linear actuator 211 is also provided. A separate motor may be used to power linear actuator 211. According to one embodiment, seal cup 220 is slidably mounted to sealable recovery vessel 100. This enables a seal 400 to be maintained between the seal cup and the sealable recovery vessel 100, yet lets the seal cup be moved up and down (e.g., towards and away from the container 101). To enable movement, a seal cup actuator comprises clamps 401, cylinders 405 and pistons 406. Pistons 406 can be moved to force the seal cup 220 against the container 101 to form a seal between the seal cup 220 and the container 101. Seal 400 may be a packing, a mechanical seal or another type of suitable seal. The seal between the seal cup 220 and container 101 is preferably maintained by constant downward pressure as desired. Another seal 415 (shown in FIG. 11 as 1135) may be provided between seal cup 220 and shaft 210. Access line 161, pressure transducer 171 and control valve 181 are connected to the upper assembly 104.

Figure 5:
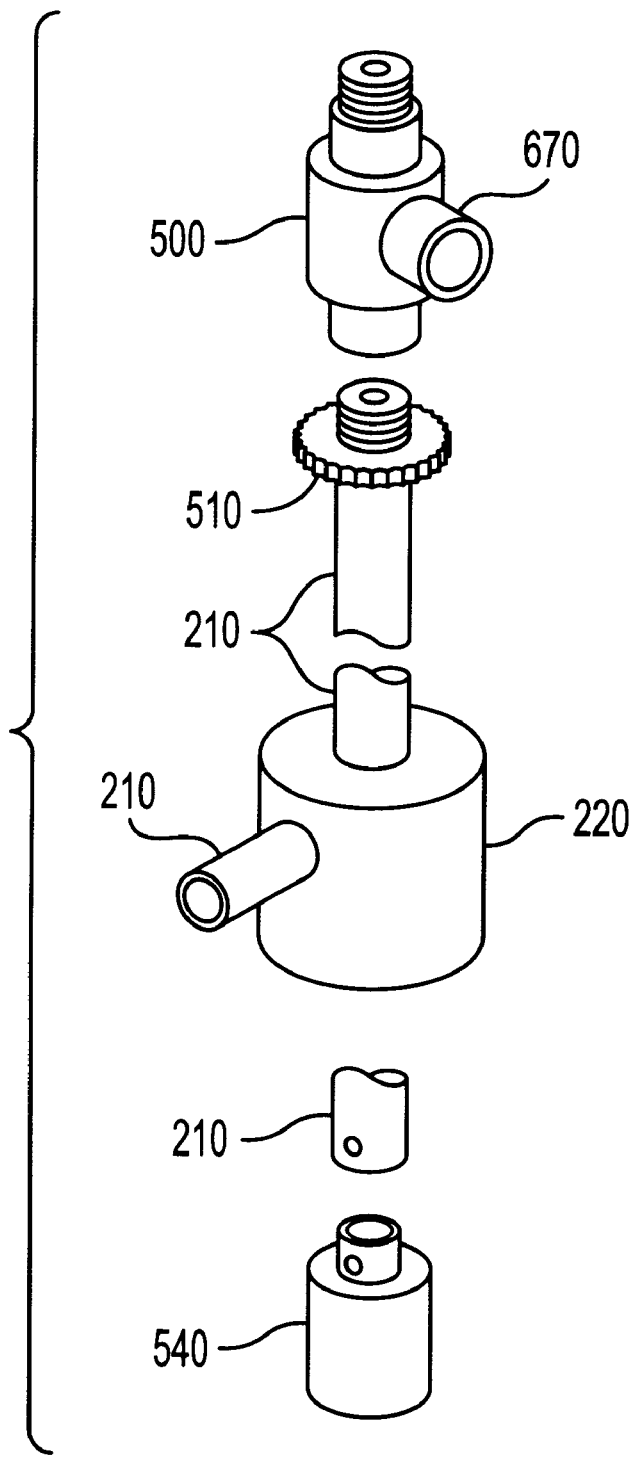
FIG. 5 is an exploded perspective view of an access assembly as shown in FIG. 4.

FIG. 5 is an exploded view of a portion of the embodiment of FIG. 4. As shown, the assembly 104 comprises a rotating union 500, drive gear 510, seal cup 220, shaft 210, and access tool 540 operably connected as shown. Access tool 540 is used to penetrate the exterior of container 101 by rotation, linear movement or by other methods. A variety of types of access tools may be used, including hole saws, drill bits, cutting tools, and other suitable access tools. Rotating union 500 is described in more detail in FIG. 6.

Figure 6:
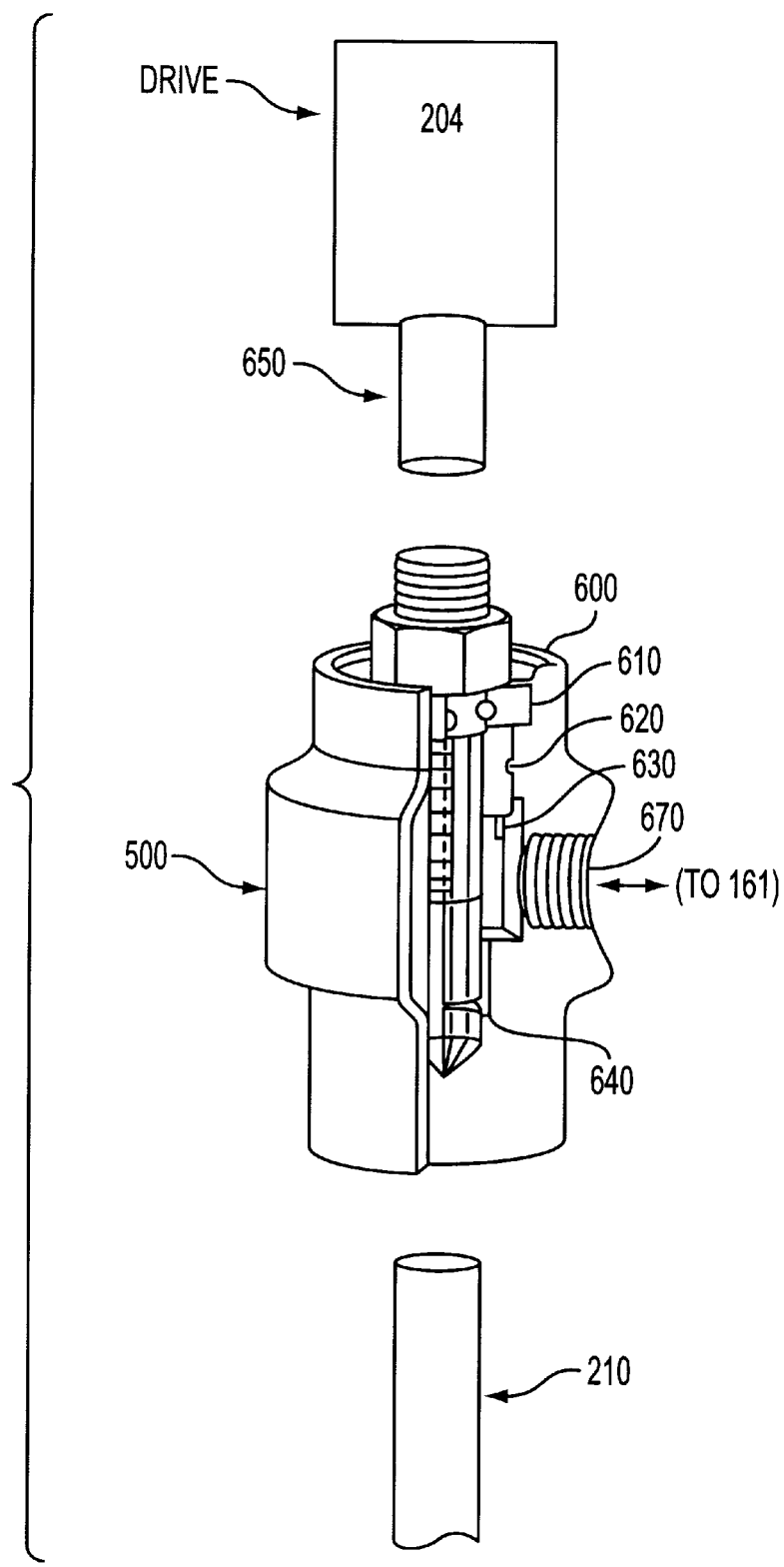
FIG. 6 is a cut-away view of the rotating union portion of the assembly shown in FIGS. 4 and 5.

FIG. 6 is a cutaway schematic illustration of rotating union 500. As shown, rotating union 500 comprises retaining rings 600, roller bearings 610, O-ring 620, mechanical seal 630, and bronze bearing 640. Shaft 210 connects to rotating union 500 by a threaded portion. Female coupling 650 threads onto the male threaded portion at the top of rotating union 500. As shaft 210 rotates, it is supported by bearings 610, and material is drawn up the shaft 210. This material is expelled through opening 670, which may be connected to access line 161.

Figure 7:
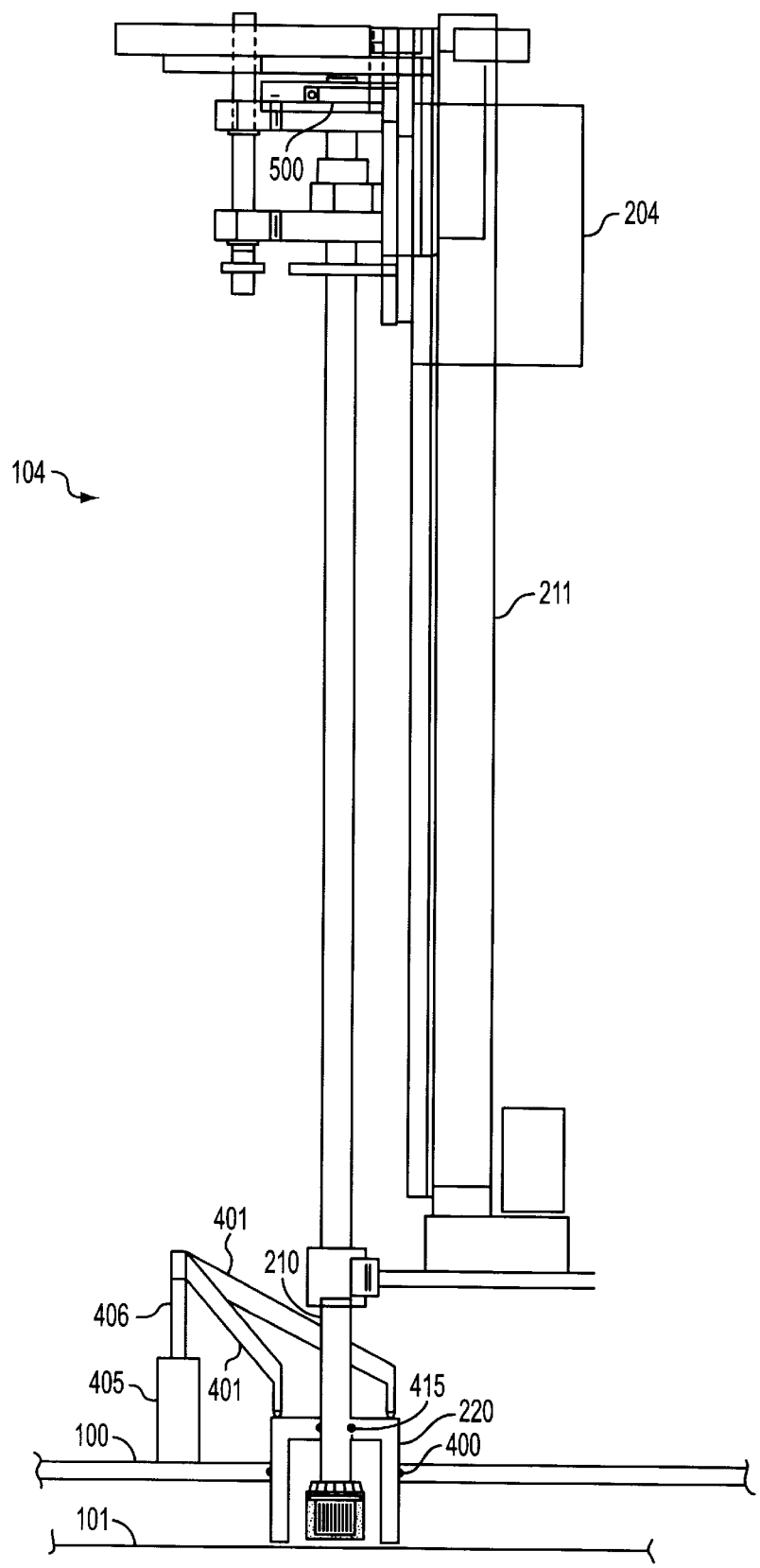
FIG. 7 is a schematic view of an access assembly for penetrating a container according to one embodiment of the present invention.

FIG. 7 depicts a side view of the embodiment of FIG. 4. Linear actuator 211, which is discussed in more detail in FIG. 8, causes shaft 210 to lower. Motor 204 is attached along with other components of the upper drill assembly 104 to carrier mount 850 of linear actuator 211, shown in FIG. 8.

Figure 8:
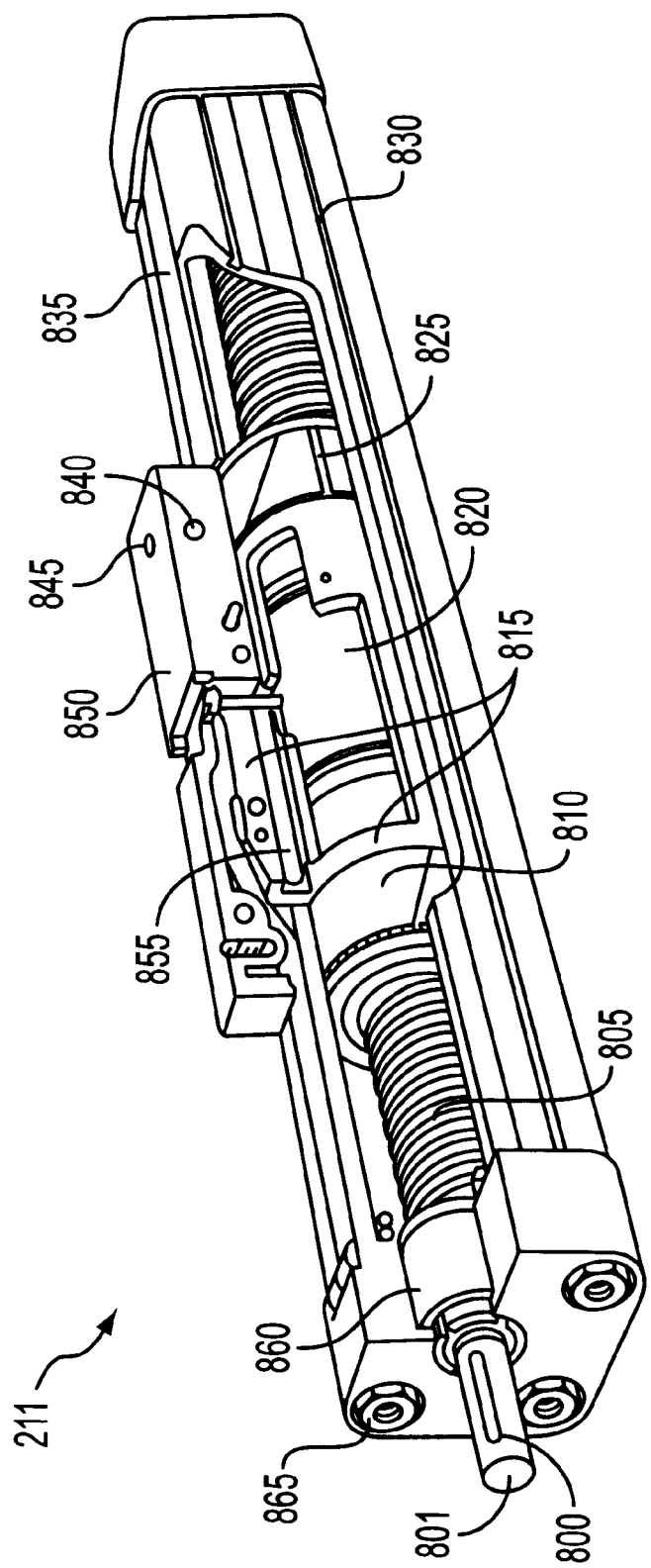
FIG. 8 is a schematic illustration of a linear actuator according to one embodiment of the present invention.

FIG. 8 depicts a cut away view of one linear actuator 211 that may be used with the present invention. Various commercially available actuators are known. Linear actuator 211 comprises shaft journal 801 with keyway 800, ball screw 805, low-friction support rings 810, load carrier 815, ball nut 820, permanent magnets 825, which may be used for position sensing, slotted profile with longitudinal grooves 830, stainless steel sealing band 835, through holes 840, threaded holes 845, carrier mount 850, bearing strip 855, precision ball bearings 860, and end cap screws with threaded mounting holes 865. Carrier mount 850 is attached to upper drill assembly 104 by a plate, brackets or other mechanism. As the ball screw 805 rotates, the carrier mount 850 moves up and down on the ball screw 805. This causes access mechanism 104 to move up or down with the carrier mount. Ball bearings 860 reduce the friction on the drive and help it move smoothly. The motor that drives this is separate and is not shown. This is just one example of a commercially available linear actuator. A variety of linear translation mechanisms are known and can be adapted for use for this purpose. Mechanical or programmable stops may be used in conjunction with the linear actuator to limit its, travel (this would prevent extension to the lower wall of container 101).

Figure 9A:
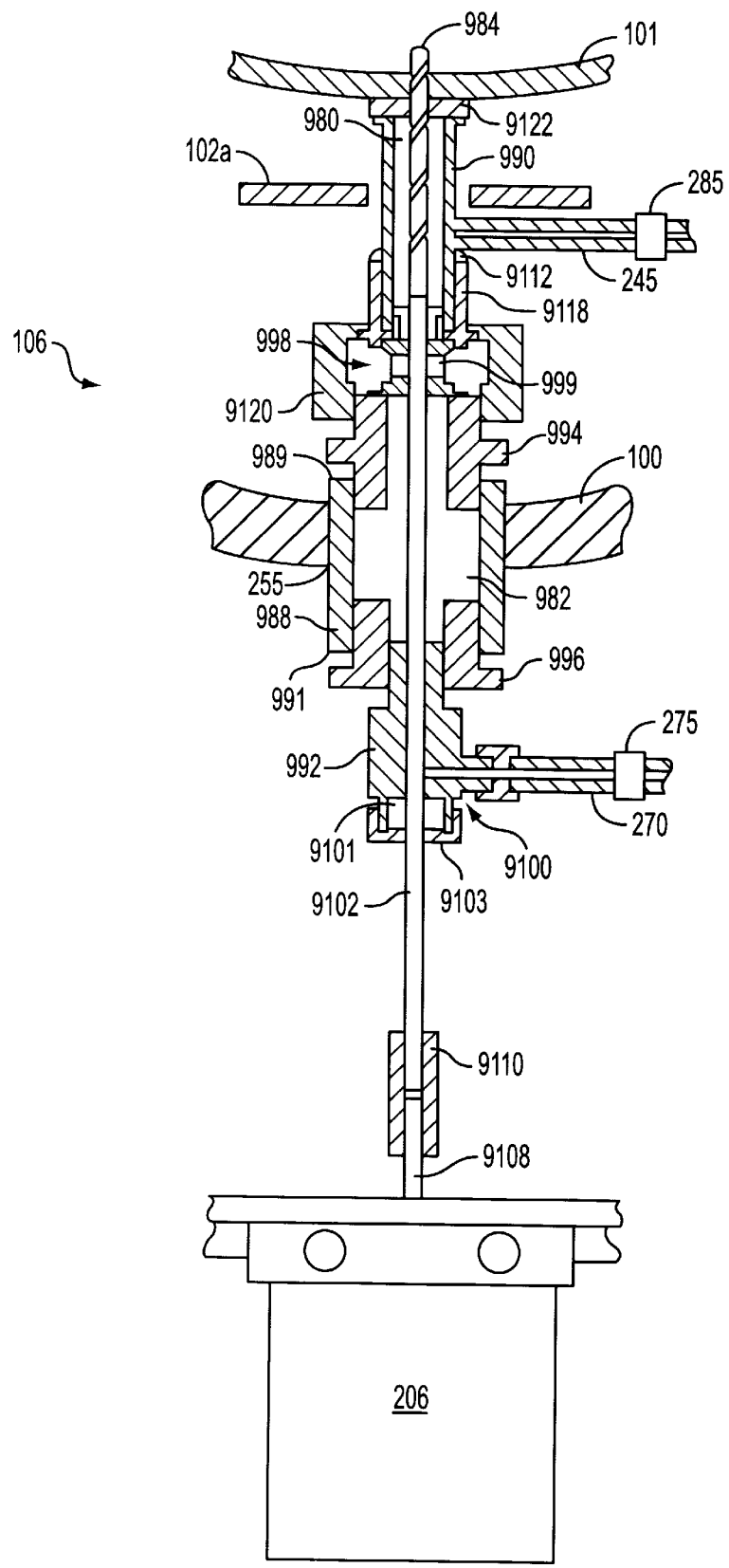
FIG. 9A is a sectional view of an access assembly for penetrating a container within a sealable recovery vessel according to one embodiment of the present invention.

FIG. 9A is an exploded view of one embodiment of a lower access mechanism 106 (as illustrated in one or more of the above-referenced patents ). Referring to FIG. 9A, opening 255 in the wall of recovery vessel 100 is provided for installation and support of the lower access mechanism 106. Cylindrical tubing 988 lines the inside diameter of opening 255. For this embodiment, cylindrical tubing 988 is welded within opening 255, although other suitable forms of attachment may be used, such as threading both the outer surface of cylindrical tubing 988 and the inside diameter of opening 255.

Lower access mechanism 106 includes a first housing section 990 and a second housing section 992. First adapter 994 is provided to secure first housing section 990 to end 989 of tubing 988 within the recovery vessel 100. Second adapter 996 is provided to secure second housing section 992 to end 991 of tubing 988 on the exterior of recovery vessel 100. A plurality of matching threads are used to attach first and second adapters 994 and 996 with their respective first housing section 990 and second housing section 992 to ends 989 and 991 of tubing 988. Housing sections 990 and 992, adapters 994 and 996 and tubing 988 cooperate with each other to define longitudinal bore 982 extending therethrough.

A first seal assembly 998, having a first packing 999, is placed on the end of first adapter 994 opposing the end threaded into tubing 988. A second seal assembly 9100, having a second packing 9101, is retained within second housing section 992 by packing nut 9103. First and second seal assemblies 998, 9100 may be any suitable assemblies including commercially available assemblies. While the type of packing assembly is not critical, the type selected may affect the performance and reliability of the seal. Second housing section 992 is threaded into the inside surface of second adapter 996. Thus, longitudinal bore 982 is formed from the interior of adapter 994, through tube 988, to the interior of adapter 996. Evacuation port 245 allows access to interior 980 of housing section 990, while port 270 allows access to longitudinal bore 982. First and second packing 999, 9101 are preferably of Teflon™ construction, but any suitable packing material may be used.

A shaft 9102 extends from the interior of first housing section 990, through first seal assembly 998, longitudinal bore 982, and second seal assembly 9100. Drill bit 984 is coupled to a drill end of shaft 9102, while a drive end is coupled to motor shaft 9108 by coupler 9110. A coupling sleeve 9118 surrounds a lower portion of first housing section 990. A seal is formed between first housing section 990 and coupling sleeve 9118 by welding sleeve 9118 to first housing section 990, as indicated at 9112. Coupling member 9120 engages the outer portion of sleeve 9118 to secure sleeve 9118 to first adapter 994. Coupling member 9120 is tightened to form a seal. A portion of the interior surface of coupling member 9120 has threads which engage threads on the outer surface of adapter 994. A gasket 9122, having a center hole 9123 (FIG. 9B) sized to receive drill bit 984, is inserted between first housing section 990 and the exterior of a wall of container 101.

Figure 9B:
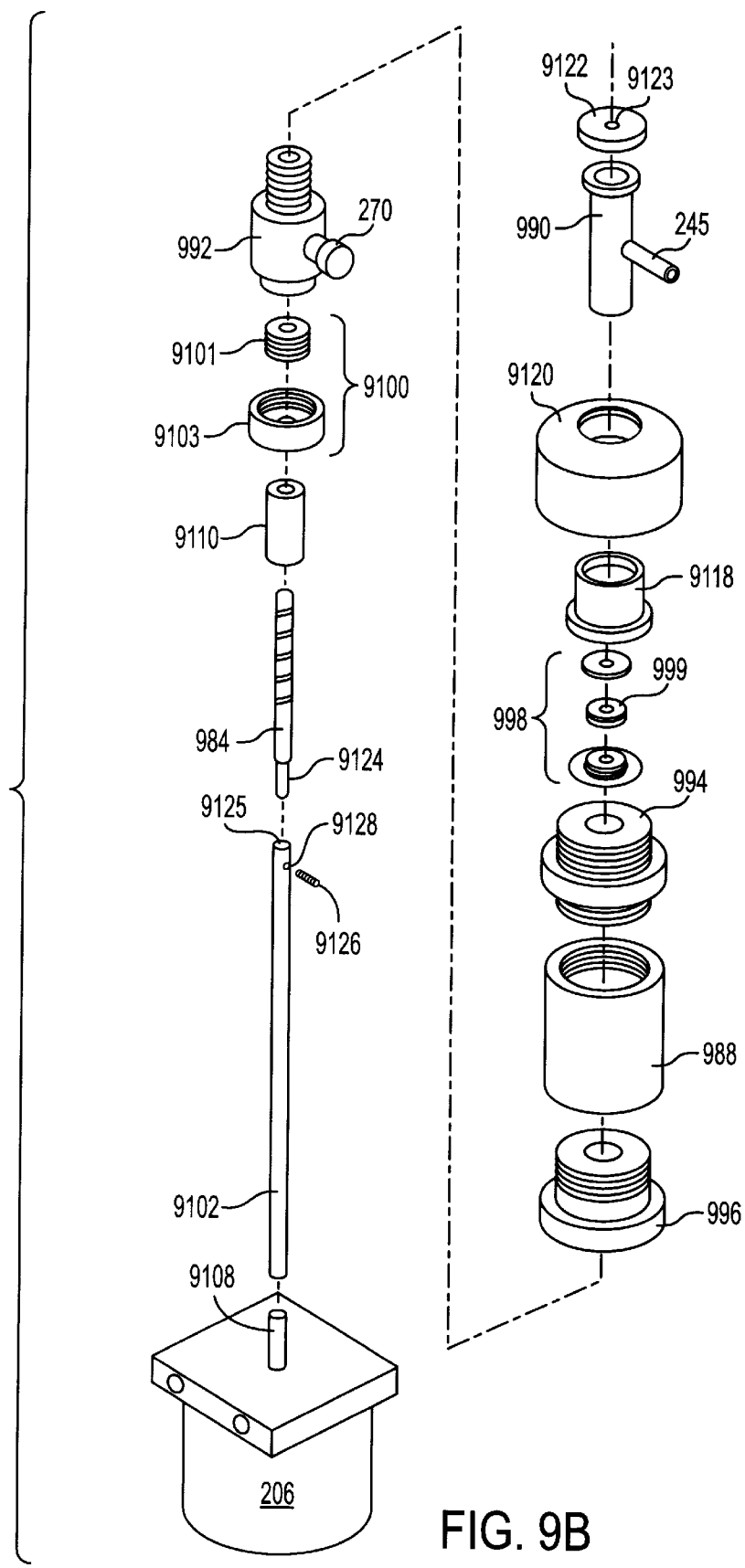
FIG. 9B is an exploded schematic illustration of the assembly of FIG. 9A.

As shown in FIG. 9B, drill bit 984 has a shank 9124 for insertion into a receiving cavity 9125 within the drill end of the shaft 9102. Shank 9124 is secured within cavity 9125 by set screw 9126. Set screw 9126 is threaded into set screw receiving hole 9128. Set screw receiving hole 9128 extends from the cavity to the exterior of shaft 9102.

Figure 10A:
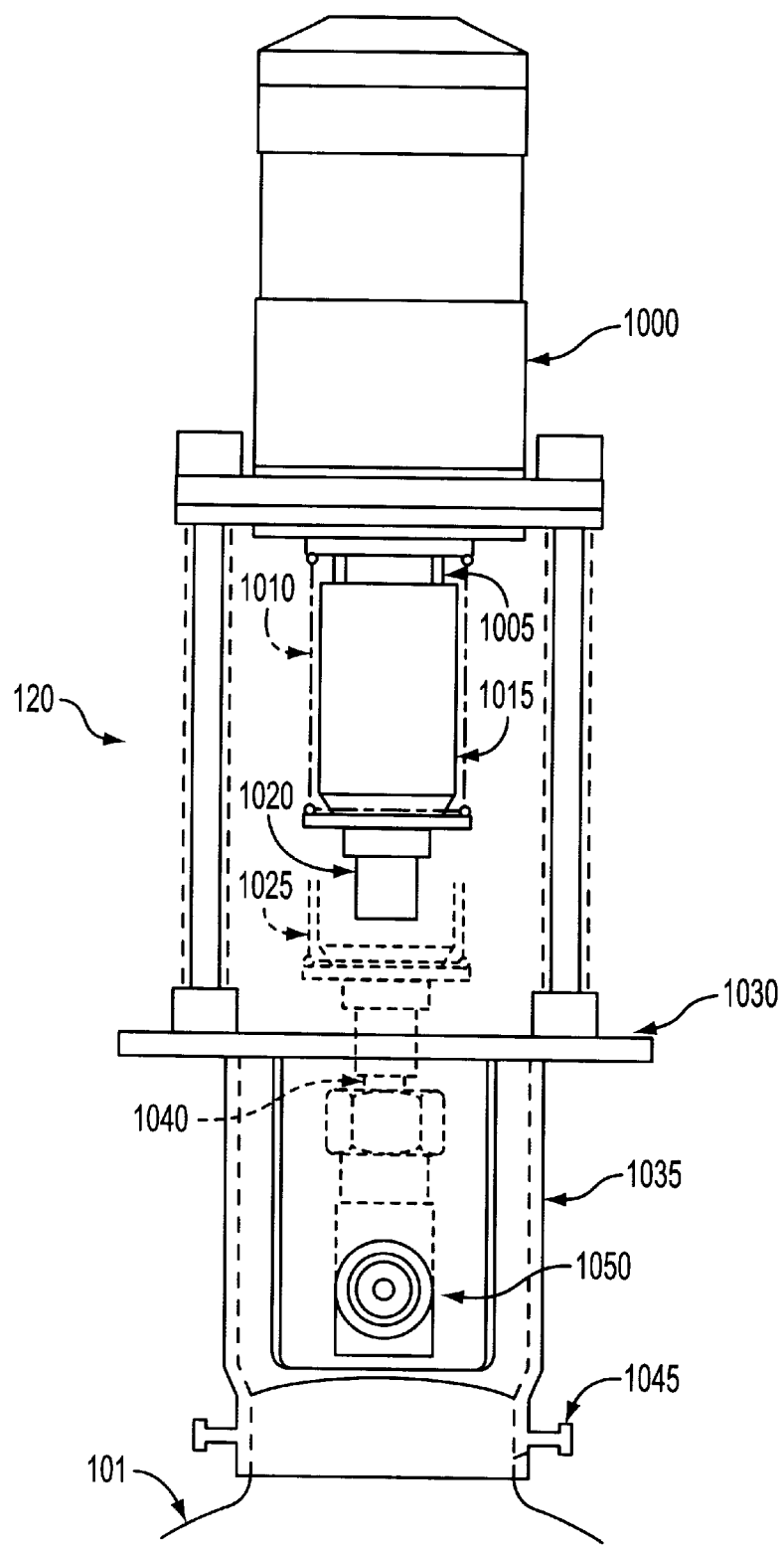
FIG. 10A is a schematic illustration of an alternative embodiment of the remote valve actuator.

FIG. 10A depicts an adapter that may be used in conjunction with certain containers (e.g., compressed gas cylinders). In this case, the cylinder valve actuator 120, according to this embodiment, comprises a modified cylinder cap 1035 which functions as a base for the actuator and attaches to the container neck ring of container 101. Locking screws 1045 secure the modified cylinder cap 1035 to the cylinder neck ring. An assembly support plate 1030 is attached to the modified cap 1035 and supports the actuator motor 1000. Actuator motor 1000 is attached to a socket assembly 1015 with a slidable retainer shaft retainer plate 1005 that extends from the motor drive into socket assembly 1015. The slidable socket assembly 1015 incorporates a spring 1010 to press the socket 1015 firmly on to the cylinder valve stem 1040. After actuation, material exits the compressed gas cylinder through valve 1050 (e.g., via an access line, pressure transducer and control valve). Element 1015 is shown in the upper portion of FIG. 10A prior to allowing the assembly to lower onto valve stem 1040. Reference numeral 1025 shows the same element, but in the lower position.

Figure 10B:
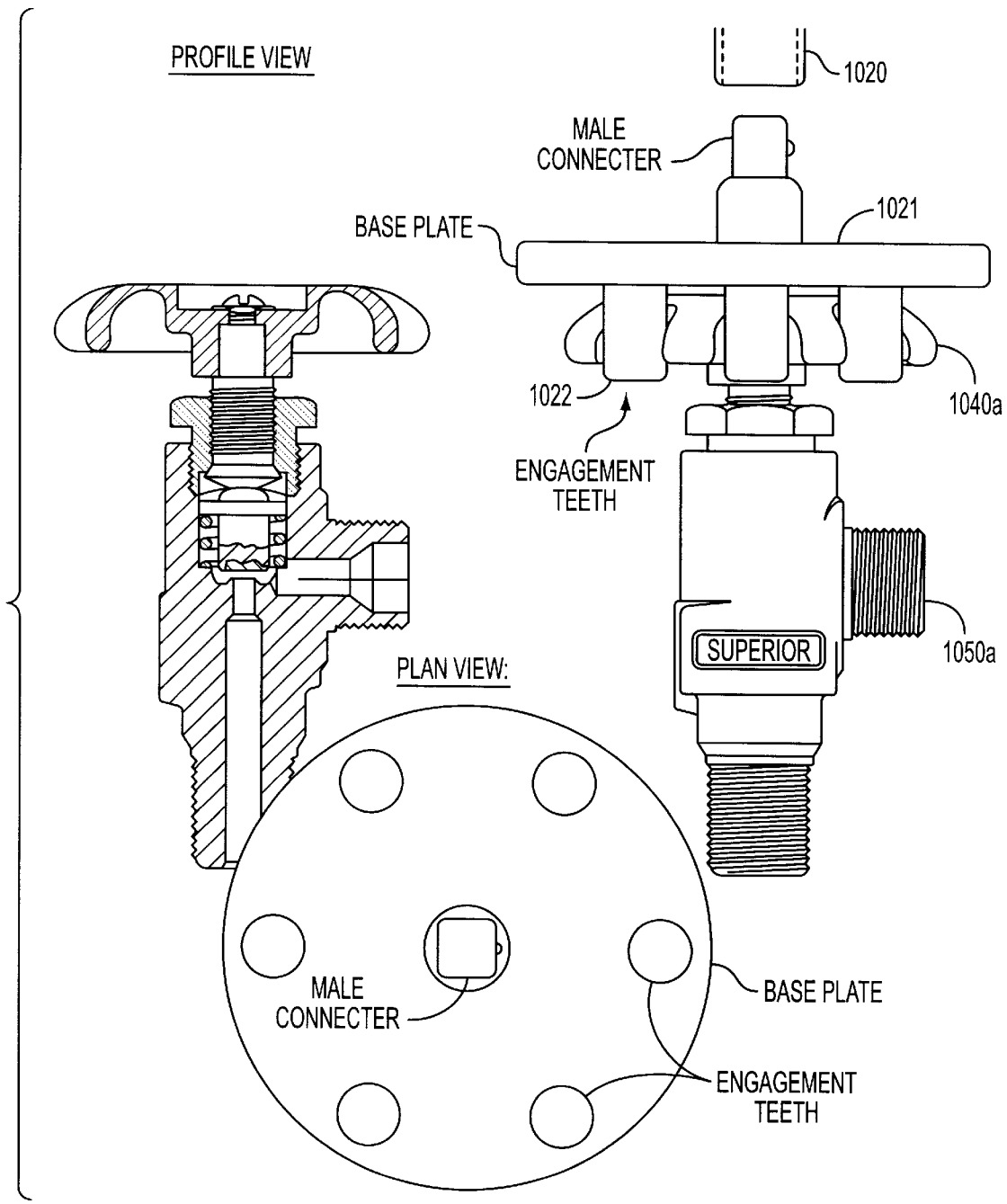
FIG. 10B is an illustration of another embodiment of the remote valve actuator.

FIG. 10B shows another embodiment to be used in conjunction with certain containers (e.g., containers with valves having stem knobs). In this case, the valved container is provided with a valve stem topped with a knob 1040a. An adapter 1021 is provided to mate with socket 1020. Adapter 1021 uses appropriately configured engagement teeth 1022 to fit into matching portions in the knob 1040a. Remote actuation is carried out in the manner described previously above.

Referring to the previous figures, in operation, container 101 is carefully placed upon support 102 through sealable end opening 110. A remote valve actuator 120 is attached to the container 101 in accordance with the valve type and container configuration. Access tube 163 is attached to the cylinder valve (e.g., 315) on which the remote actuator mechanism 120 is attached. Sealable end opening 110 is then closed to seal container 101 inside sealable recovery vessel 100. The trailer chamber 108 is also sealed.

Linear actuator 211 is used to press seal cup 220 of upper assembly 104 against the container 101 and depress the container against support 102 and onto upper seal cup of lower assembly 106. Support springs 125 are compressed as the container 101 and support 102 are pushed downward. The container 101 is maintained in this position by constant pressure applied through the seal cup 220 of the upper assembly 104.

After a fluid seal is established between upper assembly 104, lower assembly 106 and the exterior of container 101, an interior portion of assemblies 104 and 106 is filled with an inert gas (e.g., Argon) or a vacuum is drawn. Pressure transducers monitor pressure in the longitudinal bore of lower assembly 106. A transducer may similarly be installed on the upper assembly 104. Leakage may be detected by reduced pressure within the longitudinal bore. If a leak is identified, the affected assembly may be inspected for maintenance or seal replacement. The effectiveness of the seal of the upper assembly 104 can be confirmed through the rotating union 500. Although an effective seal between seal cup 220 and container 101 is not necessary, it allows increased efficiency and provides additional safety.

To access the container contents through its valve mechanism, the remote actuator 120 is used to attempt to open the valve. Motion of the valve and actuation mechanism may be observed on the closed circuit video unit using video camera 215. Successful opening will permit the container contents to be withdrawn through access tube 163 attached to the orifice of valve 315. The operator may observe successful access to the container contents through changes in pressure in the lines attached to the valve. If there is no change in pressure, the operator may confirm that the valve 315 has been opened by introducing inert gas into the container through the attached access tube 163 and container valve 315. For example, in FIG. 3 when valve 315 is opened, the system can monitor the pressure at 380 by pressure transducer 173. It is possible that valve 315 is opened but that the container 101 is under vacuum as well or if the actuator rotated the valve stem but the valve is blocked etc., the operator does not know which situation is present. The invention enables the operator to perform a test. If no pressure change is detected, the operator can introduce $N_2$ into the container 101 through valve 183 and monitor the pressure behind pressure transducer 173.

After contents (e.g., liquids) are removed from large containers such as ton containers, significant quantities may remain below the level of the goose-neck tubes 330. If the material is volatile, it may be removed through evacuation via the valve mechanism 315. For low vapor pressure liquids, this method may be inefficient. The upper assembly 104 and lower assembly 106 may be used to access the residual container contents for efficient removal.

For large containers of liquid products with blocked or inoperable valves, the upper assembly 104 is preferably used to remove the contents. Use of the upper assembly 104 minimizes the potential for leakage of any significant quantity of hazardous liquids into the sealable recovery vessel 100. The hollow tube 220 can be caused to function like a dip tube for removal of the bulk of the liquid material. The lower assembly 106 may be used following removal of the bulk of the contents through the hollow tube to efficiently remove any residual which may remain below the "dip tube" of the upper assembly 104. The lower assembly 106 may be used independently of, or in conjunction with, other units for accessing and removing the contents of containers.

After contents of the container have been removed, some residual material may remain in the container. Therefore, it may be necessary to decontaminate the interior of the container to remove any residual material. As indicated in earlier patents (e.g., U.S. Pat. Nos. 5,474,114, and 5,427, 157), decontamination solutions (e.g., reagents) may be injected into the container via the upper 104 or lower 106 access assemblies. The length of the hollow shaft 210 of upper assembly 104 provides an advantage to the decontamination operation in that a reagent spray may be directed throughout the interior of the container through the shaft. The spray may be directed in desired directions through orifices 221.

Figure 11:
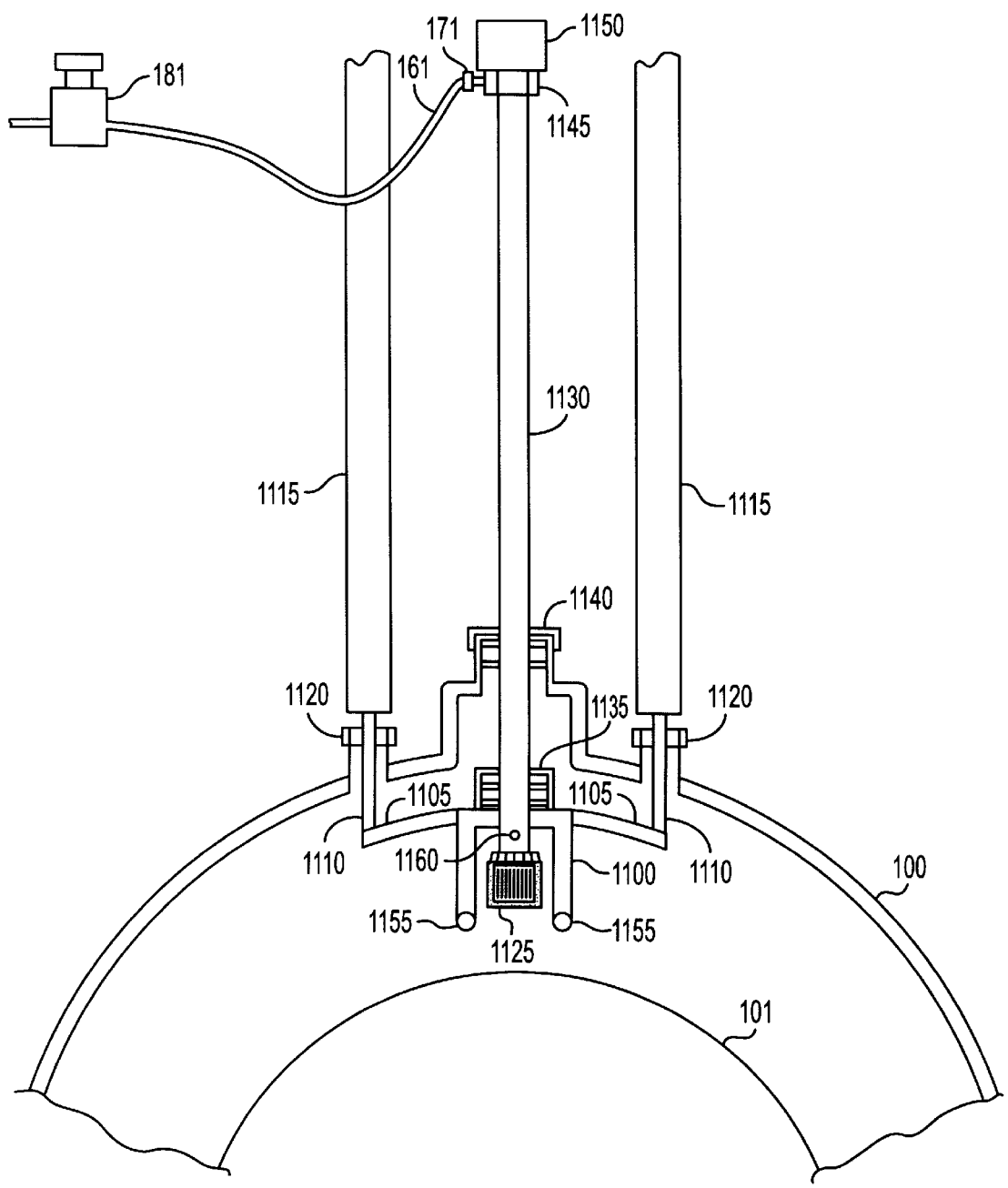
FIG. 11 is a schematic illustration of an alternative embodiment of an access mechanism.

Referring to FIG. 11, an upper access mechanism of another embodiment is shown. As shown, a seal cup 1100 is attached to a cup plate 1105 which is, in turn, attached to at least two pneumatic or hydraulic pistons 1110. Pistons 1110 preferably extend from two ram cylinders 1115 which may be located external to the sealable recovery vessel 100. The pistons 1110 are sealed by individual compression seals 1120, o-rings, or other sealing mechanisms, to make a pressure tight seal. An access tool 1125 is located within the seal cup 1100. The tool 1125 may be any one of several designs, including a hole saw or spade bit, mechanical cutters or other devices to enable access to contents of container 101 through a wall thereof. The shaft 1130 extends through shaft seals 1135 installed in the seal cup 1100. The shaft 1130 also extends through the sealable recovery vessel 100 through another shaft seal 1140. Multiple seals may be provided in series at each individual location to obtain a more reliable seal. The portion of the hollow shaft 1130 near the device 1125 may have one or more outlets, or orifices 1160 through which gasses or liquids may be introduced or removed. For example, these orifices 1160 may be used for decontamination of the container or vessel.

Bearings may be used to support the shaft at one or more positions (not shown). The portion of the shaft 1130 outside of the sealable recovery vessel 100 is attached to a rotatable coupling 1145 and motor 1150, which are attached to a linear actuator.

The seal cup 1100 comprises one or more sealing mechanisms 1155 in a location at contacts container 101. The sealing mechanisms 1155 may be O-rings, gaskets that tend around the circumference of the seal cup 1100, or other seal mechanisms. A seal formed when the seal cup 1100 is urged onto the surface of container 101.

In operation, a container 101 is supported within the sealable recovery vessel 100. The sealable recovery vessel 100 is then sealed, and may be purged and evacuated as necessary to provide an inert atmosphere or vacuum. Initially, the device 1125 is in a retracted position within the seal cup 1100. The seal cup 1100 is pressed against the container 101 by extension of the pistons 1110 from the ram cylinders 1115. The action of pressing the cup 1100 against the surface of the container 101 compresses the sealing mechanism (e.g., o-ring or gasket) 1155, located, for example, on an exterior circumference of the drill cup 1100 thereby forming a seal.

The effectiveness of the seal can be confirmed by evacuation or pressurization of the seal cup interior through the rotatable coupling 1145 and hollow shaft 1130.

Although a seal of the seal cup 1100 against the container 101 is not necessary for the access operation, it provides increased efficiency and additional safety if it is effectively achieved.

After the seal cup 1100 is in the desired position, the container 101 may be accessed by the access mechanism. For example, if the access mechanism is a drill bit, this may be accomplished by rotating the drill bit 1125 and shaft 1130 using the motor 1150. The drill bit 1125 is urged into the container 101 by a linear actuator incorporated into the upper assembly. The operator may determine the status of the operation by monitoring the pressure within the seal cup interior, by using position sensors on the shaft 1130, or other indicators.

After penetration of the container 101, its contents may be withdrawn through the interior of the shaft 1130. Withdrawal of liquids may be facilitated by using the linear actuator to extend the shaft 1130 to a location at or near the bottom portion of the container 101. The shaft 1130 then may be used as a dip tube for extraction of liquids when it is extended into liquid contents. Access tube 161, pressure transducer 171, and control valve 187 are provided to control the withdrawal from and introduction to container 101 of fluids and other materials.

After the contents of container 101 are withdrawn, the interior of the container 101 may be cleaned/decontaminated with a suitable reagent. The reagent can be introduced through the shaft 1130 and outlet(s) 1160 located near the drill bit (or other device) 1125. When introduced under pressure, a spray jet is created to provide mechanical assistance with cleaning. Pressurized steam may similarly be introduced to assist with the cleaning. The number and location of outlets 1160 may be predetermined to assure maximum coverage of the interior of the container.

Although sealable recovery vessel 100 and container 101 are shown as cylinders, various sizes shapes and configurations of recovery vessels and containers may be satisfactorily used with the present invention. The access mechanism need not be a drill or hole saw. It may be a punch, spike, saw or other structure capable of penetrating a wall of a container to permit access to the contents of the container.

Although a detailed description of the preferred embodiments has been provided, the scope of the invention is not limited thereby. Various changes and modifications within the scope of the invention will be readily apparent by those skilled in the art as defined by the appended claims.

What is claimed is:

1. In a cylinder rupture vessel comprising a sealable chamber and a mechanism for gaining access to the contents of a container located within said chamber, a method for gaining access to said contents comprising the steps of:

locating a container within the sealable chamber;

sealing the chamber;

activating a mechanism for accessing the container through the upper wall of the container;

inserting a tube into a lower part of the container; and withdrawing the contents of the container through said tube.

2. The method of claim 1 further comprising the steps of: inducing a vacuum in said chamber prior to accessing said contents.

3. The method of claim 1 further comprising the step of introducing Argon into said chamber prior to accessing the container.

4. The method of claim 1 further comprising the step of accessing the container contents from the bottom of said container.

5. The method of claim 1 further comprising the step of treating the contents of said container while said container is in said chamber.

6. The method of claim 1 further comprising the step of decontaminating the container while said container is located in said chamber.

7. The method of claim 1 further comprising the step of treating the contents of said container and decontaminating said container while said container is located in said chamber.

* * * * *